United States Patent Office 3,305,488
Patented Feb. 21, 1967

3,305,488
DETERGENT COMPOSITIONS
Lloyd I. Osipow, New York, N.Y., Frederick J. Brashear, Santa Ana, Calif., and William Rosenblatt, Spring Valley, N.Y.; said Osipow and said Rosenblatt assignors to State of Nebraska as represented by the Secretary of Agriculture and Inspection, Lincoln, Nebr.
No Drawing. Filed Mar. 19, 1965, Ser. No. 442,573
10 Claims. (Cl. 252—117)

This application is a continuation-in-part of our copending application Serial No. 279,602, filed May 10, 1963, and now abandoned.

The present invention relates to both liquid and solid built-detergent compositions that are more rapidly degraded by bacteria in sewage than conventional detergents.

The surface-active agent that has, until now, been predominantly used in built-detergent compositions is sodium tetrapropylene benzene sulfonate (ABS). This is a low-cost material with excellent detergent characteristics when properly compounded. However, it is quite resistant to decomposition by bacteria in sewage-treatment plants.

Concurrently, the detergent industry is undergoing a massive change-over from the use of ABS to linear alkylbenzene sulfonate (LAS), because LAS is more readily biograded than ABS. It is the view of important segments of the industry that LAS does not degrade rapidly enough to resolve the pollution problem and there will be a further change to straight-chain alkyl sulfates and sulfonates, which do not contain the aromatic ring.

The problem is compounded by the broad range of conditions under which organic pollutants are expected to decompose. In a modern sewage treatment plant operated under optimum conditions, LAS is biodegraded successfully. Under poorer operating conditions, there is need for a more rapidly biodegraded detergent such as the straight-chain alkyl sulfates. At the other extreme, in ground water conditions are largely anareobic. Depending upon the degree of aeration, even the straight-chain alkyl sulfates may not degrade rapidly enough. This problem is particularly acute in rural areas, where septic tanks and wells for drinking water are often poorly related with regard to drainage. Thus, even detergents considered to have acceptable biodegradability are not satisfactorily biodegradable under anaerobic conditions.

Another aspect of the problem relates to the unknown nature and toxicity of intermediates formed during the biodegradation of detergents. The final product of bacterial degradation is carbon dioxide. Intermediates are organic compounds of variable chain length. They are present in the system long after tests have shown that the detergents have been completely biodegraded. At any given time interval these intermediates are present to a greater extent, the more resistant the detergent to biodegradation.

The one class of detergents that does not present any problem is soap. These natural detergents become insoluble in water at neutral and acid pH levels, and are precipitated by calcium and magnesium ions present as "hardness" in water. They are also precipitated by alum and other conventional precipitating agents used in sewage-treatment plants. Soaps are readily and completely removed from water even in the least efficient sewage-treatment plants. In ground water they precipitate and deposit on clay and sand, and are not transported by water.

Soap is known to be a biologically "soft" material. That is, it is readily decomposed by bacteria in sewage plants. There are two reasons for this. First, a straight hydrocarbon chain is more readily assimilated by bacteria than a branched hydrocarbon chain. Second, because of the presence of a carboxylate group, soap is converted to an insoluble form by contact with multivalent cations. This insoluble form can be readily removed in normal water treatment. Also it does not have the objectionable characteristics of a detergent in treated water, that is, it does not foam. Further, it increases the dwell time in the sewage plant, providing a greater opportunity for degradation by bacteria.

Moreover, soaps are advantageous as a detergent since fats and oils necessary for their manufacture are available at reasonable cost.

If soaps were used in place of synthetic surfactants, the problem of water pollution by detergents would not have arisen. However, because they are precipitated by water "hardness," they are not good detergents in hard water.

If soaps could be used effectively in combination with synthetic detergents, the magnitude of the problem could be reduced to the extent that soap replaced the synthetic organic detergent. Unfortunately, combinations of the natural soaps with synthetic detergents do not perform well with regard to either detergency or foam.

It is, therefore, an object of this invention to provide solid and liquid detergent compositions which have a high degree of biodegradability under both aerobic and anaerobic conditions.

A further object is to provide detergent compositions containing a relatively large quantity of soap without reducing the cleaning and foaming power.

These and other objects of our invention will become apparent as the description thereof proceeds.

We have discovered that certain modified soaps can be used to replace a substantial portion of the synthetic organic detergent in built-detergent compositions without loss of detergency or foaming properties. Performance may actually be increased. Since these modified soaps are as readily insolubilized and precipitated as the natural soaps, they also reduce this pollution problem to the extent that they are used as replacements for the synthetic organic detergents. Biodegradability is also enhanced to the same extent. The synthetic surfactant may be replaced from 25 to 75 percent in amount.

A further advantage of these modified soaps is that they can be used in both solid and liquid built-detergent compositions. The modified soaps actually improve the water-insolubility of the solid components in liquid built-detergent compositions, as compared with the contribution of the natural soaps.

Another advantage of the modified soaps is that they are fully saturated and not prone to rancidity, as in the case of oleate soaps. Other advantages and benefits will be evident from the practice of our invention.

The modified soaps used in the practice of this invention are well known, but have not previously been used in accordance with the teachings of this invention. Furthermore, reasoning by analogy could not have suggested the superior results that were obtained. These modified soaps used in the practice of our invention are water-soluble salts of hydroxystearic acid, with the hydroxyl group attached to the tenth carbon atom, counting from the carboxyl carbon atom which is number one. Undoubtedly, a portion of the product contains the hydroxyl group on the ninth carbon atom, and other isomers may be present. For convenience, we refer to the soaps as salts of 10-hydroxystearic acid. The water-soluble salts of 10-hydroxystearic acid are the alkali metal, ammonium and water-soluble amine salts.

The hydroxystearic acid used in the practice of our invention is conveniently prepared from oleic acid, which is first sulfated and then hydrolyzed to produce the hydroxystearic acid.

Soaps of 10-hydroxystearic acid are relatively poor detergents, as compared for example with soaps of stearic acid. Similarly, soaps of 12-hydroxystearic acid, prepared from hydrogenated recinoleic acid, are also relatively poor detergents. Consequently, it is surprising and unexpected that the soaps of 10-hydroxystearic acid in combination with synthetic organic detergents in built compositions have excellent performance qualities.

A great number of synthetic surfactants and detergent builders are suitable for use in combination with the modified soap. For example, a dry detergent composition may contain 4 to 30 percent by weight of organic detergents consisting of (1) 2 to 20 percent of the sodium soap of hydroxystearic acid prepared by hydrolyzing sulfated oleic acid and (2) 2 to 20 percent by weight of non-soap synthetic surface active agents such as sodium alkylbenzene sulfonate, sodium alkyl sulfate, sodium alkyl sulfonate, a member of the class $R(OC_2H_4)_xSO_4Na$, sodium ethionate and taurate derivatives of fatty acids, sodium sulfated glyceryl monoesters of fatty acids, sodium sulfated glycydyl monoethers of fatty alcohols, $$R(OC_2H_4)_yOC_2H_4OH$$

alkyl dimethyl amine oxide and alkyl alkanolamides, where alkyl groups directly attached to benzene contain 8 to 16 carbon atoms, all other alkyl groups, fatty acids and fatty alcohols used to prepare derivatives contain 12 to 20 carbon atoms, R is an alkyl or alkylbenzene group, $x$ is a number from 1 to 6, $y$ is a number from 6 to 15, and the alkyl alkanolamides are prepared from alkanolamines selected from the group consisting of mono- and diethanolamine and -propanolamine, and (3) at least 70 percent by weight of detergent builders consisting essentially of the sodium salts of molecularly dehydrated phosphates, sodium silicate, sodium sulfate, sodium chloride and sodium carboxymethyl cellulose. Up to 20 percent water may be present in some instances.

In the case of liquid detergents, the compositions are combinations of alkali metal, ammonium and water-soluble amine soaps of 10-hydroxystearic acid in combination with the non-soap synthetic surface active agents, where the organic sulfates are present as sodium, ammonium or water-soluble amine salts and the organic sulfonates are present as alkali metal, ammonium or water-soluble amine salts.

By water-soluble amine is meant, for example, morpholine, mono-, di-, and triethanolamines and -propanolamines. The ratios of ingredients for the liquid detergents are from 4 to 50 percent organic detergent (including 10-hydroxystearate soap as 2 to 30 percent) and 40 to 96 percent water. In addition, up to 30 percent detergent builders and up to 15 percent coupling agents may be present, although either or both may be omitted.

Suitable coupling agents are for example, ethanol, propanol, alkyl sulfate, alkyl sulfonate, alkyl and dialkyl benzene sulfonate, and alkyl and dialkyl naphthalene sulfonate where the total number of carbon atoms in all of the alkyl groups in a singular molecular species is from 1 to 10.

The following specific examples are presented to illustrate the invention and to enable persons skilled in the art to better understand and practice the invention and are not intended to be limitative.

*Example I*

The following example describes a procedure used for the preparation of 10-hydroxystearic acid.

This intermediate compound was prepared according to a procedure described by Roe, Schaffer, Dixon and Ault, J. Am. Oil Chemist's Soc. 24, 45 (1947). The method consisted of sulfating oleic acid, followed by hydrolysis to form the monohydroxy compound. Commercial oleic acid, 266.7 grams (0.9 M), 93% unsaturation, was placed into a 2 liter flask, cooled to 10° C. in an ice-water bath. Sulfuric acid, 216.0 grams (2.2 M) of 96% concentration was added slowly over a period of one hour. The reaction mixture was allowed to stand one-half hour at 5° C. with occasional stirring. Water was then added rapidly to the reaction mass to bring the total volume to about 1500 cc., and the reaction mixture was boiled for one hour. The aqueous layer was removed, and the hydrolyzed material was washed with boiling water. The hydrolyzate was transferred to a 2 liter, 3-neck flask, fitted with a mechanical stirrer and reflux condenser, and 565.3 cc. of alcoholic KOH was added. The mixture was refluxed for six hours. The alccohol was removed by steam distillation. The crude product was neutralized with dilute sulfuric acid at 60 to 65° C. and then taken up in warm n-hexane. The hexane layer was washed with hot water until sulfate free. The hydroxystearic acid was recrystallized from hexane by standing over night at 25° C. The crude product was filtered and dried. Repeated recrystallization from high boiling petroleum ether yielded 207 grams of a white wax-like product melting at 58–59° C. Sulfur-containing surfactant present was less than 0.005%.

|  | Found | Theoretical |
|---|---|---|
| Acid value | 187.0 | 186.7 |
| Hydroxy value | 180.6 | 186.7 |

In the examples that follow, a number of trade name materials are recited. They are identified as follows:

| Trade Name | Source | Composition |
|---|---|---|
| Ultrawet K | Atlantic Refining Co | 90% active sodium tetrapropylene benzene sulfonate. |
| Ninol AD 31 | Stephan Chemical Co | Lauric isopropanolamide. |
| Ninol AA62 Extra | do | Lauric diethanolamide. |
| Ninex 303 | do | 40% active sodium xylene sulfonate. |
| Triton X100 | Rohm & Haas Co | Isooctyl phenyl polyethoxy ethanol. |
| Igepon AP-78 | General Aniline & Film Corp | 65% active oleyl ester of sodium isethionate. |
| Sipex TS | American Alcolac Corp | 25% active sodium tallow sulfate. |
| Duponol WA Paste | E.I. du Pont de Nemours | 30% active sodium lauryl sulfate. |
| Calsoft F-90 | Pilot Chemical Co | 90% active sodium salt of linear alkylbenzene sulfonate (LAS). |

*Example II*

This example shows detergency results obtained with built-detergent compositions. The synthetic surfactants (synthetic organic detergents) used in these tests were ABS, oleyl ester of sodium isethionate, sodium tallow sulfate, LAS, and sodium lauryl sulfate. Comparisons were made with and without partial replacement of the synthetic surfactant by one of the following soaps: sodium 10-hydroxystearate, sodium stearate, or sodium oleate.

The compositions of the built detergents used in this example are shown in Table I. These compositions are representative of current commercial practice. Table II shows the effect on detergency of partial replacement of ABS by various soaps. In general, the greatest detergency (largest value for reflectance units gained) is obtained when a portion of the ABS is replaced by sodium 10-hydroxystearate.

Table III shows the effect on detergency of partial replacement of two other synthetic surfactants by sodium 10-hydroxystearate. Detergency is improved when half of the oleyl ester of sodium isethionate is replaced by this modified soap. In the case of sodium tallow sufate, detergency is improved when half and three quarters of the alkyl sulfate is replaced by sodium 10-hydroxystearate.

In Table IV the effect of partial replacement of LAS by various soaps is shown. The results clearly demonstrate that sodium 10-hydroxystearate improves detergency, while sodium stearate and sodium oleate have a deleterious effect on detergency.

Table V shows similar results with sodium lauryl sulfate. Partial replacement by sodium 10-hydroxystearate does not adversely affect detergency. However, similar replacement of part of the sodium lauryl sulfate by sodium oleate or sodium stearate has a deleterious effect on detergency.

TABLE I.—COMPOSITION OF BUILT DETERGENTS

|  | Parts by weight | |
| --- | --- | --- |
|  | A | B |
| Surfactants (100% active basis) | 15 | 22 |
| Sodium tripolyphosphate | 30 | 30 |
| Tetrasodium pyrophosphate | 10 | 10 |
| Sodium silicate ($Na_2O$:3.2 $SiO_2$) | 5 | 5 |
| Sodium carboxymethyl cellulose | 1 | 1 |
| Sodium sulfate | 39 | 32 |

The ability of the compositions to remove soil was determined as follows:

The built detergents were compared by running simultaneous wash tests in a Launderometer. This machine rotates twenty jars end-over-end in a bath of fixed temperature. In each jar are standard soiled cloths, wash solution, and rubber balls to provide "load." The test method gives useful comparative results, provided that the detergents to be compared are run simultaneously and portions of the same batch of standard soiled cloth are used. For check runs, the same series is repeated a second time and a third time. Then the values for each detergent can be averaged and incidental variables will largely cancel out when the averages are compared. The system is what is usually called a group experiment.

The heavy duty detergents were tested in one such group experiment, using a standard soiled cotton. The test conditions were as follows:

Amount of solution per jar _____ 100 ml.
Mechanical washing assistants _____ 8 rubber balls ⅜" diameter.
Temperature _____ 55° C.
Speed of rotation of jars _____ 40 r.p.m.
Time of washing ____ 15 minutes.
Rinsing procedure ___ Rotate two minutes with 150 ml. water of same hardness as wash water.
Fabrics per jar _____ Two swatches of FDS soiled cotton 3 x 2 inches.
Reflectance reading __ By Hunter Multipurpose Reflectometer set to read 100 on magnesia block.

Results are shown in Tables II and III.

TABLE II.—SOIL REMOVAL WITH ABS SOAP COMBINATIONS AT 55° C.

[Other ingredients in accordance with Table I]

| Surfactant composition, percent | | | | | Reflectance units gained | | | |
| --- | --- | --- | --- | --- | --- | --- | --- | --- |
| ABS | Lauryl mono-iso-propanol amide | Sodium hydroxy stearate | Sodium stearate | Sodium oleate | 2 gr. water | | 15 gr. water | |
|  |  |  |  |  | 0.20% | 0.35% | 0.20% | 0.35% |
| 13 | 2 | -------- | -------- | -------- | 8.8 | 16.1 | 6.6 | 15.7 |
| 8 | 2 | 5 | -------- | -------- | 9.8 | 20.0 | 5.9 | 16.6 |
| 8 | 2 | -------- | 5 | -------- | 7.8 | 16.0 | 5.7 | 12.2 |
| 8 | 2 | -------- | -------- | 5 | 10.8 | 17.1 | 4.9 | 13.6 |
| 3 | 2 | 10 | -------- | -------- | 8.8 | 20.3 | 5.4 | 14.4 |
| 3 | 2 | -------- | 10 | -------- | 6.1 | 13.5 | 4.6 | 6.8 |
| 3 | 2 | -------- | -------- | 10 | 9.6 | 14.0 | 3.3 | 11.2 |
| 20 | 2 | -------- | -------- | -------- | 12.8 | 18.9 | 8.5 | 17.1 |
| 10 | 2 | 10 | -------- | -------- | 14.3 | 21.5 | 5.9 | 19.3 |
| 10 | 2 | -------- | 10 | -------- | 9.4 | 16.9 | 5.4 | 13.9 |
| 10 | 2 | -------- | -------- | 10 | 12.4 | 18.4 | 5.1 | 13.8 |

TABLE III.—SOIL REMOVAL USING COMBINATIONS OF HYDROXYSTEARATE SOAP WITH OLEYL ISETHIONATE AND WITH TALLOW SULFATE AT 55° C.

[Other ingredients in accordance with Table I]

| Surfactant composition, percent | | | | Reflectance units gained | | | |
| --- | --- | --- | --- | --- | --- | --- | --- |
| Oleyl ester of sodium isethionate | Sodium tallow sulfate | Lauryl monoiso-propanol amide | Sodium hydroxy stearate | 2 gr. water | | 15 gr. water | |
|  |  |  |  | 0.20% | 0.35% | 0.20% | 0.35% |
| 20 | -------- | 2 | -------- | 13.7 | 19.3 | 11.5 | 16.6 |
| 10 | -------- | 2 | 10 | 15.8 | 20.0 | 10.2 | 17.7 |
| 5 | -------- | 2 | 15 | 14.1 | 17.7 | 6.4 | 16.8 |
| -------- | 20 | 2 | -------- | 12.9 | 17.7 | 9.6 | 13.6 |
| -------- | 10 | 2 | 10 | 13.4 | 19.7 | 9.6 | 16.6 |
| -------- | 5 | 2 | 15 | 13.8 | 20.2 | 8.9 | 18.5 |

TABLE IV.—SOIL REMOVAL WITH LAS SOAP COMBINATIONS AT 55° C.

[Other ingredients in accordance with Table I]

| Surfactant Composition, percent | | | | | Reflectance units gained | | | |
|---|---|---|---|---|---|---|---|---|
| LAS | Lauryl monoiso- propanol amide | Sodium hydroxy stearate | Sodium stearate | Sodium oleate | 2 gr. water | | 15 gr. water | |
| | | | | | 0.20% | 0.35% | 0.20% | 0.35% |
| 20 | 2 | -------- | -------- | -------- | 16.3 | 21.8 | 13.2 | 20.0 |
| 10 | 2 | 10 | -------- | -------- | 24.2 | 27.2 | 9.3 | 25.5 |
| 10 | 2 | -------- | 10 | -------- | 11.2 | 21.0 | 6.9 | 14.0 |
| 10 | 2 | -------- | -------- | 10 | 16.9 | 20.6 | 7.0 | 18.5 |

TABLE V.—SOIL REMOVAL WITH SODIUM LAURYL SULFATE SOAP COMBINATIONS AT 55° C.

[Other ingredients in accordance with Table I]

| Surfactant composition, percent | | | | | Reflectance units gained | | | |
|---|---|---|---|---|---|---|---|---|
| Sodium lauryl sulfate | Lauryl monoiso- propanol amide | Sodium hydroxy stearate | Sodium stearate | Sodium oleate | 2 gr. water | | 15 gr. water | |
| | | | | | 0.20% | 0.35% | 0.20% | 0.35% |
| 20 | 2 | -------- | -------- | -------- | 17.8 | 27.7 | 15.3 | 23.7 |
| 10 | 2 | 10 | -------- | -------- | 21.3 | 26.9 | 11.0 | 25.9 |
| 10 | 2 | -------- | 10 | -------- | 12.7 | 23.4 | 8.8 | 18.2 |
| 10 | 2 | -------- | -------- | 10 | 14.5 | 23.6 | 10.4 | 18.1 |

*Example III*

The hydroxystearate soaps are poor detergents as compared with such conventional soaps as sodium stearate. Thus, it is quite remarkable that sodium 10-hydroxystearate in combination with synthetic surfactants in built-detergent compositions substantially out-performs conventional soaps. This poor performance is shown in Table VI, in which unbuilt soaps were compared. The detergency test procedure was the same as given in Example II.

*Example IV*

Conventional soaps depress the foam of built synthetic detergent compositions. In contrast, sodium 10-hydroxystearate does not adversely affect foam. This is shown in Table VII. Similar results were obtained with the other synthetic surfactants of Example II.

The foam test of this example is that of Ross and Miles (Oil & Soap 5, 99–102, 1941). Essentially this test consists of running 200 ml. of solution through a standard orifice into a water-jacketed cylinder which contains 50 ml. of the same solution. The height of the column of foam generated is measured immediately and again after one, five and ten minutes. Duplicate determinations were made. High foam is an important psychological factor.

TABLE VII.—ROSS & MILES FOAM TEST—0.20% BUILT COMPOSITIONS AT 43° C.; SAMPLE a–k IN 2 GR. WATER, l–n IN 15 GR. WATER

[All compositions contained 2% of lauryl monoisopropanolamide and other ingredients in accordance with Table I]

| Sample | ABS, percent | Sodium soap, percent | Soap type | Foam height (cm.) | | | |
|---|---|---|---|---|---|---|---|
| | | | | 0 min. | 1 min. | 5 min. | 10 min. |
| a | 13 | -------- | -------- | 16.5 | 14.5 | 13.5 | 13.0 |
| b | 8 | 5 | Hydroxystearate | 18.0 | 15.0 | 15.0 | 14.0 |
| c | 8 | 5 | Stearate | 5.0 | 4.5 | 4.2 | 4.0 |
| d | 8 | 5 | Oleate | 15.0 | 13.0 | 12.5 | 12.0 |
| e | 3 | 10 | Hydroxystearate | 17.0 | 15.5 | 15.0 | 14.5 |
| f | 3 | 10 | Stearate | 2.5 | 2.0 | 2.0 | 1.5 |
| g | 3 | 10 | Oleate | 10.0 | 9.0 | 9.0 | 8.5 |
| h | 20 | -------- | -------- | 17.5 | 15.5 | 15.5 | 15.0 |
| i | 10 | 10 | Hydroxystearate | 18.0 | 16.0 | 16.0 | 15.0 |
| j | 10 | 10 | Stearate | 7.5 | 6.5 | 6.5 | 6.0 |
| k | 10 | 10 | Oleate | 11.5 | 13.0 | 13.0 | 12.0 |
| l | 13 | -------- | -------- | 18.5 | 16.0 | 15.5 | 15.0 |
| m | 8 | 5 | Hydroxystearate | 18.0 | 15.0 | 15.0 | 14. |
| n | 8 | 5 | Stearate | 4.0 | 3.5 | 3.5 | 2.0 |

TABLE VI.—SOIL REMOVAL WITH UNBUILT SOAP AT 55° C.

| Soap | Reflectance units gained | |
|---|---|---|
| | 2 gr. water, 0.20% | 10 gr. water, 0.20% |
| Sodium stearate | 23.3 | 16.7 |
| Sodium 10-hydroxystearate | 6.2 | 7.6 |
| Sodium 12-hydroxystearate | -------- | 8.3 |

*Example V*

This example shows that in some instances sodium 10-hydroxystearate can be used in place of the nonionic surfactant octylphenyl condensed with 9–10 moles of ethylene oxide to improve the performance of liquid dishwashing compositions. Table VIII shows that this substitution is advantageous with LAS but not with sodium lauryl sulfate.

TABLE VIII.—DISHWASHING TEST. 0.10% CONCENTRATION WATER INITIALLY AT 45° C.

| | Parts by weight | | | | | | | |
|---|---|---|---|---|---|---|---|---|
| | a | b | c | d | e | f | g | h |
| LAS | 30 | 30 | 25 | 25 | | | | |
| Sodium lauryl sulfate | | | | | 30 | 30 | 25 | 25 |
| Lauryl diethanol amide | 5 | 5 | 5 | 5 | 5 | 5 | 5 | 5 |
| Octylphenol 9-10 ETO | 5 | | 10 | | 5 | | 10 | |
| Sodium hydroxy stearate | | 5 | | 10 | | 5 | | 10 |
| Water | 60 | 60 | 60 | 60 | 60 | 60 | 60 | 60 |

| | Dishes washed to foam end point | | | | | | | |
|---|---|---|---|---|---|---|---|---|
| | a | b | c | d | e | f | g | h |
| 2 grains water | 8 | 9 | 9 | 11.5 | 11 | 8.5 | 9 | 6.5 |
| 15 grains water | 7 | 10 | 9 | 10 | | | | |

Suds stability in the presence of soil was evaluated by the manual dishwashing test to obtain the results in Table VIII. The test procedure involved the washing of soiled dishes until the foam no longer completely covered the surface of the solution. The number of dishes washed to the foam end point were recorded. Preparation of the soiled dishes and procedure follow:

Porcelain dinner plates were smeared with ½ teaspoon per plate of melted soil consisting of 80% Crisco, 20% flour and enough Oildag for a distinctive dirty coloring. The soiled plates were placed in racks and aged for 24 hours at room temperature. The detergent was placed on the bottom of a dishpan (12 cm. deep, 36 cm. bottom diameter, 38 cm. top diameter) containing one liter of 2-grain water at 45° C., which is used to dissolve the test detergent. An additional three liters of water at 45° C. were poured into the dishpan through a ½-gallon glass funnel from a height of 30 inches directly above the center of the dishpan. The funnel was partially filled with small ground glass stoppers to control the rate of water flow. After 30 seconds, the soiled dishes were individually washed with a dishrag until clean. Additional dishes were washed until the foam disappeared. Favorable results were also obtained with built solid compositions as shown in Table IX.

For all the combinations examined, it is clearly evident that the presence of sodium 10-hydroxystearate results in a high, stable foam.

*Example VI*

This example shows that the solubility characteristics of alkali soaps of 10-hydroxystearic acid are favorable for the preparation of built liquid detergent compositions. The test compositions and their appearance are shown in Table X. Sodium 12-hydroxystearate, prepared from hydrogenated ricinoleic acid, was also included in the comparison. Only compositions containing the alkali soaps of 10-hydroxystearic acid were clear and homogeneous.

Sodium xylene sulfonate is often included in liquid detergent compositions to improve compatibility. Ninex 303, a 40 percent aqueous solution of sodium xylene sulfonate, was subsequently added to several of these compositions. The addition of 5 percent of Ninex 303 to compositions (b) and (e)—containing sodium or potassium 10-hydroxystearate—converted these products from viscous, clear to fluid, clear solutions. In contrast, it was necessary to add 15% of Ninex 303 to composition (a) to obtain a single-phase product.

TABLE X.—BUILT LIQUID DETERGENT COMPOSITIONS

| | Parts by weight | | | | | |
|---|---|---|---|---|---|---|
| | a | b | c | d | e | f |
| Tetrapotassium pyrophosphate | 20 | 20 | 20 | 20 | 20 | 20 |
| Ultrawet K | 20 | 10 | 10 | 10 | 10 | 10 |
| Ninol AA62 Extra | 2 | 2 | 2 | 2 | 2 | 2 |
| Sodium 10-hydroxystearate | | 10 | | | | |
| Sodium 12-hydroxystearate | | | 10 | | | |
| Sodium oleate | | | | 10 | | |
| Potassium 10-hydroxystearate | | | | | 10 | |
| Potassium oleate | | | | | | 10 |
| Water | 58 | 58 | 58 | 58 | 58 | 58 |

TABLE IX—SUDS STABILITY IN THE PRESENCE OF SOIL COMPOSITIONS IN ACCORDANCE WITH TABLE I 0.15% BUILT COMPOSITION IN 2-GRAIN WATER

Number of dishes washed to a foam end point
(a) _____ 4
(b) (Sodium 10-hydroxystearate) _____ 5
(c) (Sodium stearate) _____ 3

Appearance

Compositions (a), (c), (d) and (f) each separated into two phases of approximately equal volume.

Compositions (b) and (e) were clear, one phase, viscous solutions.

Table XI shows that clear liquid built compositions are more readily prepared with the oleyl ester of sodium isethionate if sodium 10-hydroxystearate is present.

TABLE XI.—BUILT LIQUID DETERGENT COMPOSITIONS

| | Parts by weight | | | |
|---|---|---|---|---|
| | a | b | c | d |
| Tetrapotassium pyrophosphate | 20 | 20 | 20 | 20 |
| Oleyl ester of sodium isethionate [1] | 20 | 10 | | |
| Sodium tallow sulfate [2] | | | 20 | 10 |
| Sodium 10-hydroxystearate | | 10 | | 10 |
| Water [3] | 60 | 60 | 60 | 60 |

[1] Igepon AP-78 (active).
[2] Sipex TS (active).
[3] Includes salts present in Igepon AP-78 and in Sipex TS.

All solutions were opaque.
  (a), (c) and (d): Did not clarify with additions of up to 20 grams of Ninex 303.
  (b): Clarified after the addition of 4 grams of Ninex 303.

The above examples clearly demonstrate that these isomeric hydroxystearate soaps can play a significant role in this new era of biodegradable detergent compositions. They can be used to replace a substantial proportion of the synthetic surfactants in both liquid and solid detergent compositions, without any loss in performance properties. In some instances these properties are enhanced. Compatibility is improved when these soaps are incorporated into built liquid compositions. Since these materials exhibit the usual response of soaps to pH change and to divalent cations, there is complete assurance that they will be inactivated under all treatment conditions and that they will not find their way into wells or the effluent from sewage treatment plants.

While certain specific examples and preferred modes of practice of the invention have been set forth it will be understood that this is solely for the purpose of illustration and that various changes and modifications may be made without departing from the spirit of the disclosure and the scope of the appended claims.

We claim:
1. A detergent composition consisting essentially of, as percent by weight,
  (a) 4 to 50 percent of organic detergents,
  (b) 0 to 96 percent of additives selected from the group consisting of inorganic alkaline detergent builders, carboxymethyl cellulose and its water-soluble salts; and
  (c) 0 to 96 percent of water
wherein said organic detergents consist of from 25% to 75% of a 10-hydroxy-stearate soap, the cation of said soap being selected from the group consisting of sodium, potassium, ammonium, morpholine, monoethanolamine, monopropanolamine, diethanolamine, dipropanolamine, triethanolamine and tripropanolamine; and the remainder of said organic detergents being selected from the group consisting of anionic organic non-soap detergents and non-ionic organic non-soap detergents.

2. The detergent composition of claim 1 wherein said remainder of said organic detergents is predominantly an alkyl benzene sulfonate having a total of 10 to 15 carbon atoms in the alkyl groups and having a cation selected from the group consisting of sodium, potassium, ammonium, morpholine, monoethanolamine, monopropanolamine, diethanolamine, dipropanolamine, triethanolamine and tripropanolamine.

3. The detergent composition of claim 2 wherein said cation is sodium.

4. The detergent composition of claim 1 wherein said remainder of said organic detergents is predominantly the oleyl ester of sodium isethionate.

5. The detergent composition of claim 1 wherein said remainder of said organic detergents is predominantly sodium alkyl sulfate having from 12 to 18 carbon atoms in the alkyl group.

6. The detergent composition of claim 1 wherein said remainder of said organic detergents is predominantly sodium tallow sulfate.

7. The detergent composition of claim 1 wherein said remainder of said organic detergents is predominantly sodium lauryl sulfate.

8. The detergent composition of claim 1 wherein said remainder of said organic detergents is predominantly an alkyl ethoxy sulfate having 12 to 18 carbon atoms in the alkyl group, from 1 to 4 ethoxy groups and a cation selected from the group consisting of sodium, potassium, ammonium, morpholine, monoethanolamine, monopropanolamine, diethanolamine, dipropanolamine, triethanolamine and tripropanolamine.

9. A solid detergent composition consisting essentially of, as percent by weight,
  (a) 4 to 30 percent of organic detergents,
  (b) 50 to 96 percent of additives selected from the group consisting of inorganic alkaline detergent builders, carboxymethyl cellulose and its water-soluble salts; and
  (c) 0 to 20 percent of water
wherein said organic detergents consist of from 25% to 66⅔% of sodium 10-hydroxystearate and the remainder of said organic detergents being selected from the group consisting of anionic organic non-soap detergents and non-ionic organic non-soap detergents.

10. A liquid detergent composition consisting essentially of, as percent by weight,
  (a) 4 to 50 percent of organic detergents,
  (b) 0 to 30 percent of additives selected from the group consisting of inorganic alkaline detergent builders, carboxymethyl cellulose and its water-soluble salts,
  (c) 0 to 15 percent of coupling agents selected from the group consisting of ethanol, propanol, salts of alkyl sulfates, salts of alkyl sulfonates, salts of alkyl benzene sulfonates, salts of dialkyl benzene sulfonates, salts of alkyl naphthalene sulfonates and salts of dialkylnaphthalene sulfonates, where in the total number of carbon atoms in all of the alkyl groups in each of the said salts is from 1 to 10 and the cation of said salts is selected from the group consisting of sodium, potassium and ammonium; and
  (d) 40 to 96 percent of water
wherein said organic detergents consist of from 25% to 60% of a 10-hydroxystearate soap, the cation of said soap being selected from the group consisting of sodium, potassium, ammonium, morpholine, monoethanolamine, monopropanolamine, diethanolamine, dipropanolamine, triethanolamine and tripropanolamine; and the remainder of said organic detergents being selected from the group consisting of anionic organic non-soap detergents and non-ionic organic non-soap detergents.

References Cited by the Examiner

UNITED STATES PATENTS

| | | | |
|---|---|---|---|
| 901,905 | 10/1908 | Imbert | 260—413 |
| 2,367,050 | 1/1945 | Price | 260—413 |

(Other references on following page)

UNITED STATES PATENTS

| | | | |
|---|---|---|---|
| 2,390,295 | 12/1945 | Flett | 252—121 |
| 2,438,169 | 3/1948 | Hoyt | 252—121 |
| 2,480,564 | 8/1949 | Forney | 260—413 |
| 2,781,320 | 2/1957 | Jelinek et al. | 252—117 |
| 2,793,132 | 5/1957 | Davis et al. | 260—413 XR |
| 2,860,170 | 11/1958 | Lamberti et al. | 252—89 |
| 2,930,760 | 5/1960 | Gebhardt | 252—89 |

OTHER REFERENCES

"Preparation of Hydroxy Acids by Sulfaction of Oleic and Linoleic Acids," J. Am. Oil Chemist's Soc., vol. 24 (1957), (pages 45–48 relied on).

LEON D. ROSDOL, *Primary Examiner.*

J. T. FEDIGAN, *Assistant Examiner.*